Patented Mar. 21, 1944

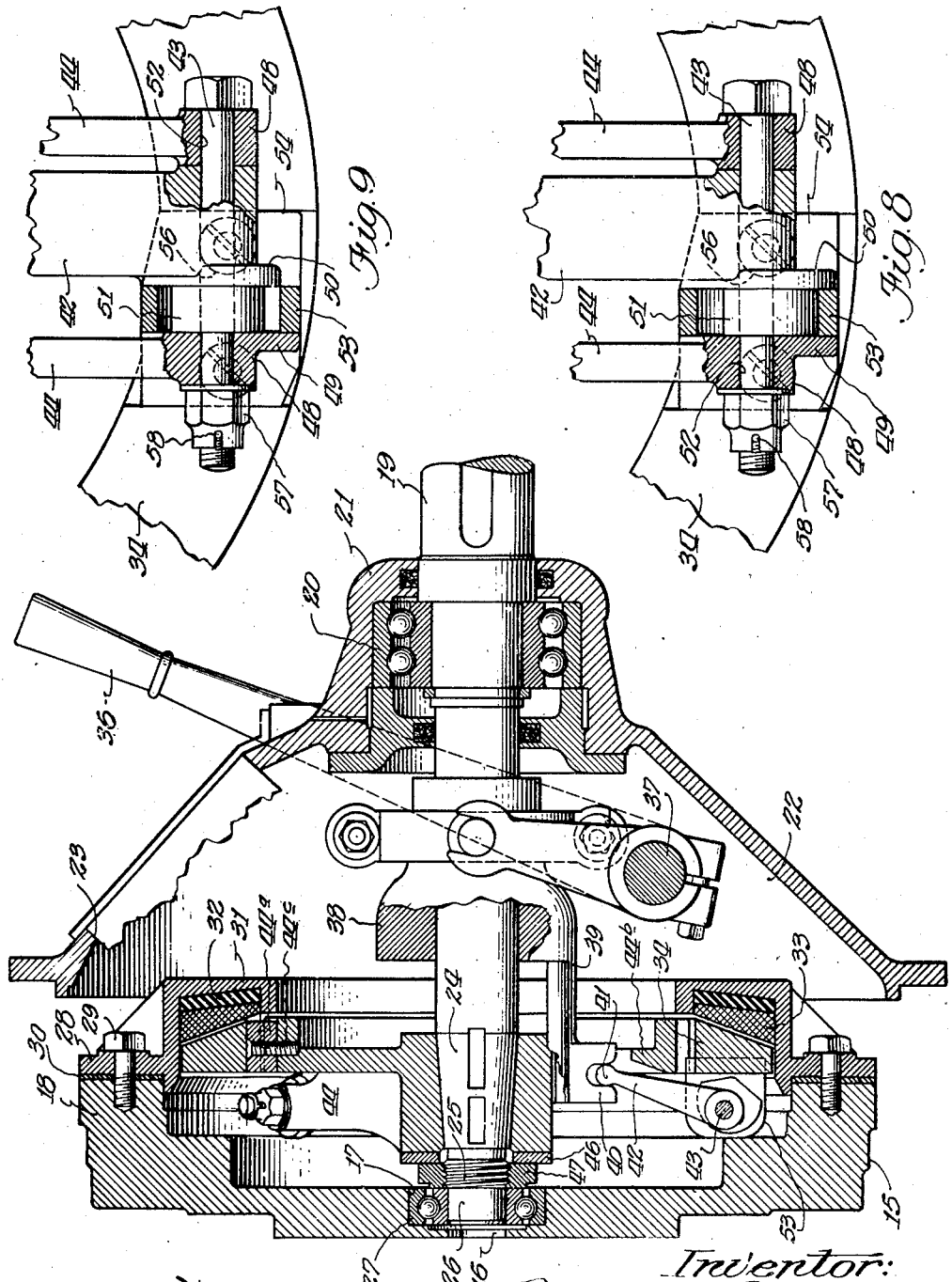

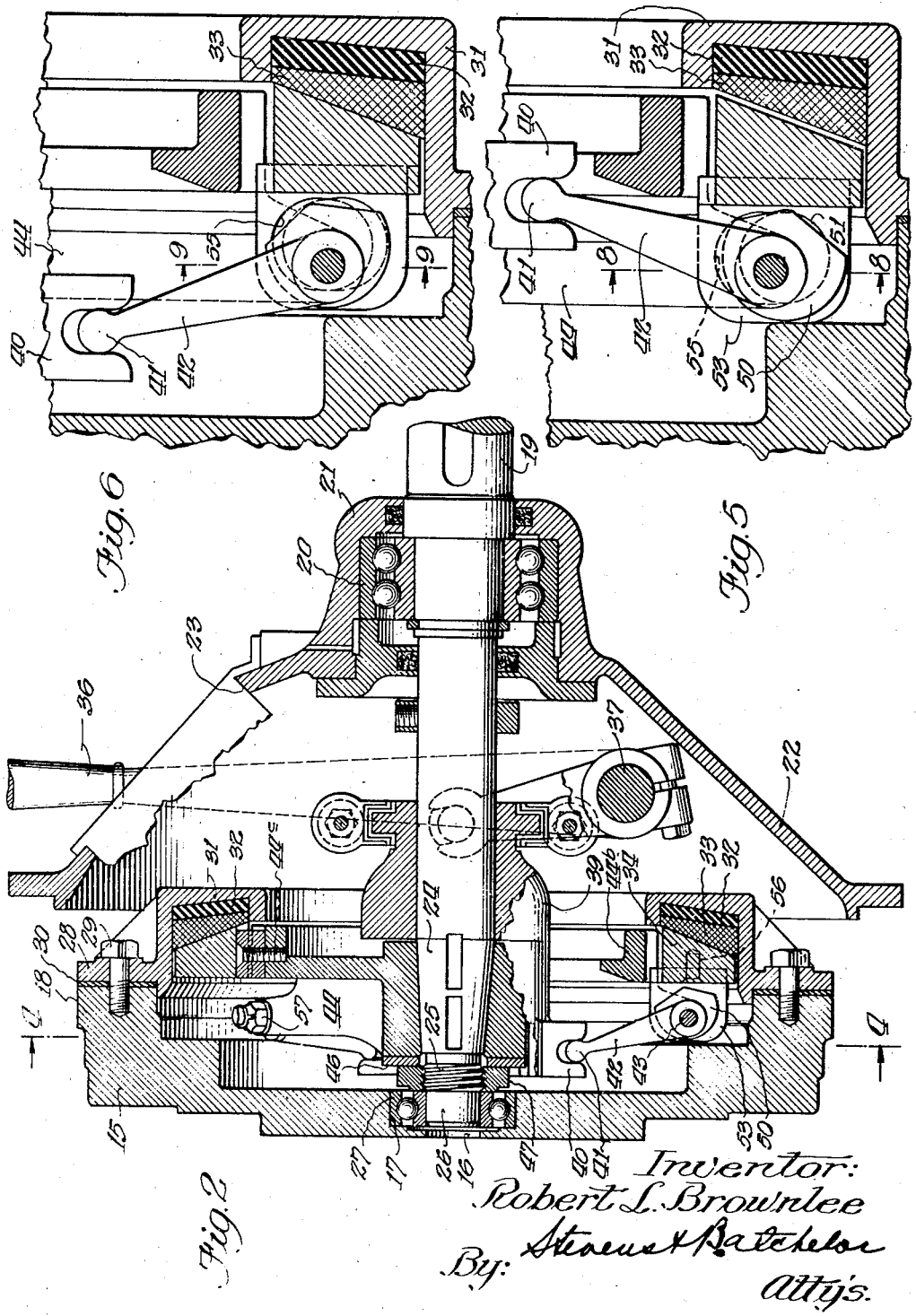

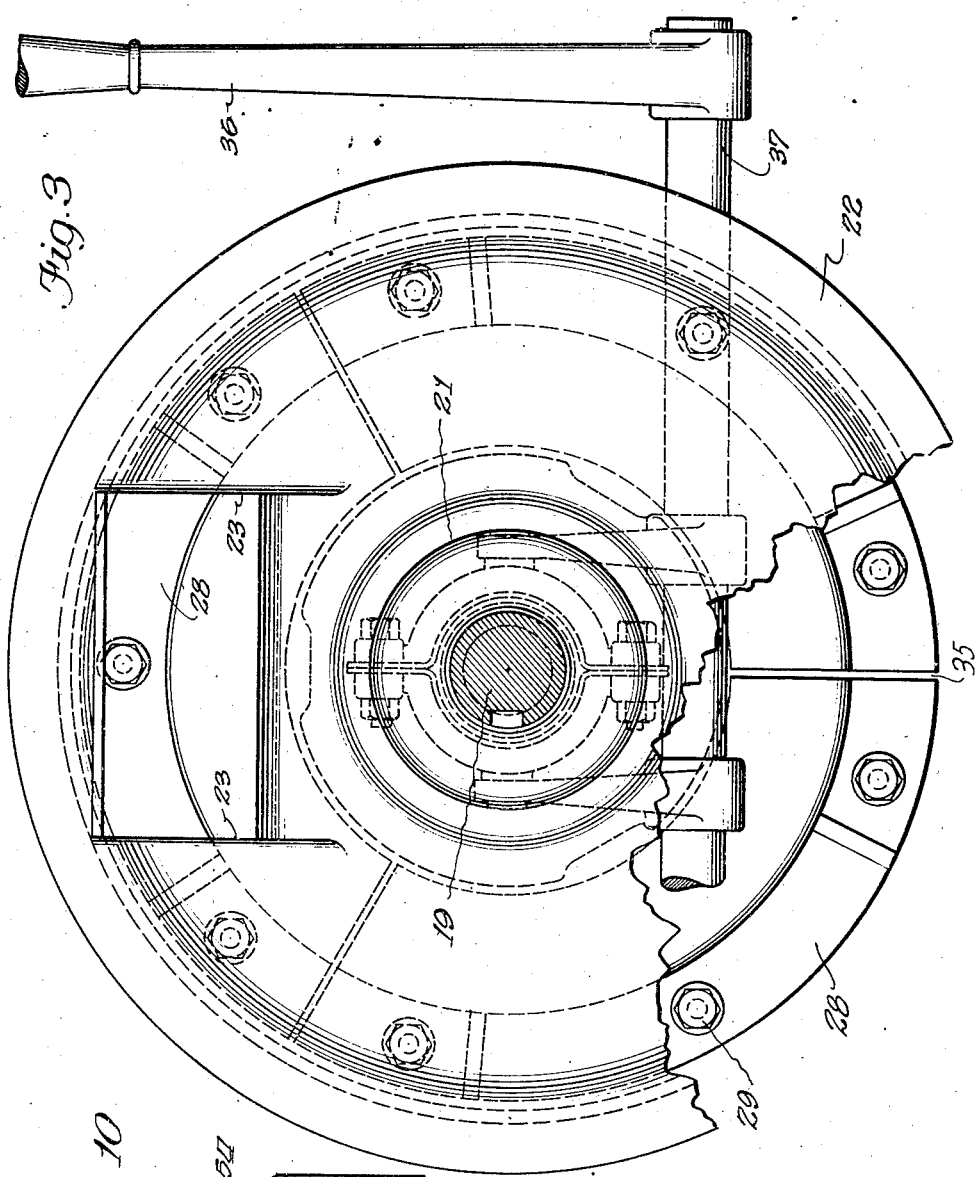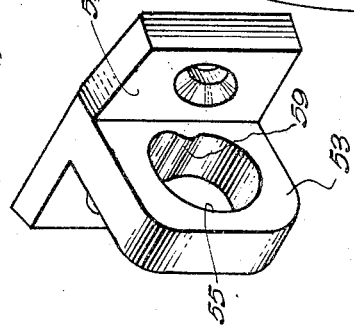

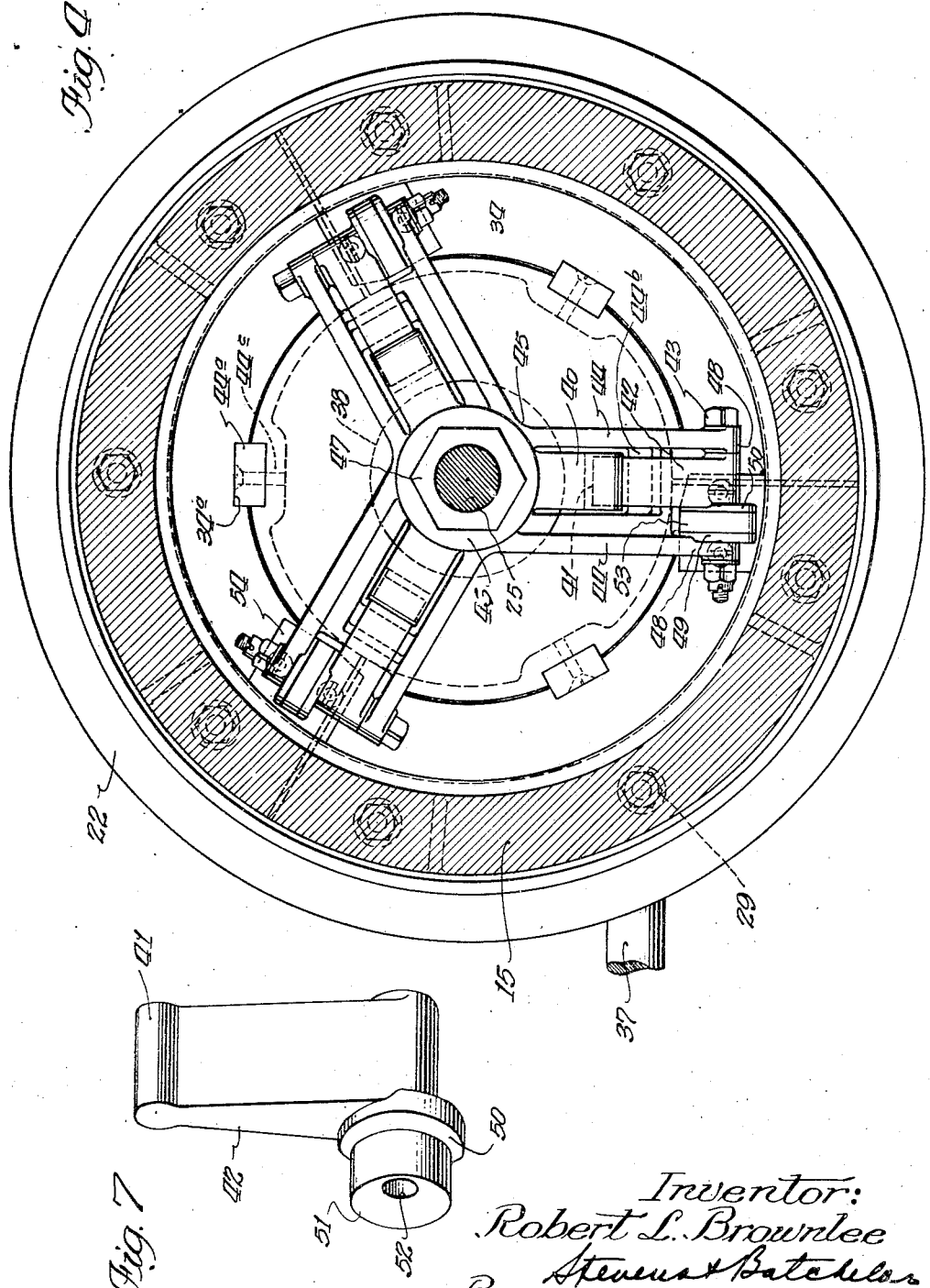

2,344,592

UNITED STATES PATENT OFFICE 2,344,592

POWER TAKE-OFF CLUTCH

Robert L. Brownlee, Chicago, Ill.

Application November 15, 1941, Serial No. 419,344

6 Claims. (Cl. 192—66)

My invention relates to clutches forming part of power take-off units applicable to internal combustion engines, and more particularly to installations employing the engine flywheel as a driving source, and my main object is to provide a clutch from which the lining or other material receiving the wear is easily removable and replaceable.

A further object of the invention is to design a clutch in which the lining or other material referred to is carried by the driving unit of the clutch.

Another object of the invention is to construct the driving unit of the clutch in a cluster of sections, which are easily detachable and small enough to be removed or replaced by way of the clutch housing entrance.

A further object of the invention is to so design the clutch as to locate the driving unit exposedly in the housing instead of between the flywheel and the driven unit, as is the common practice.

Another object of the invention is to design a clutch in which the engaging stress is away from, rather than toward the engine or other power unit carrying the flywheel or the like, so that no end-thrust is imparted to the bearings or other vital parts of such engine or power unit.

An additional object of the invention is to employ a control which, while actuated in a forward direction to engage the clutch, really institutes a rearward movement in the clutch to accomplish the purpose.

An important object of the invention is to build the novel clutch of few parts which are simple, sturdy and designed to operate over an extended period without particular attention or repair.

With the above objects in view and any others which may suggest themselves from the description to follow, a better understanding of the invention may be had by reference to the accompanying drawings, in which—

Fig. 1 is a longitudinal section of the clutch in the disengaged position;

Fig. 2 is similar view of the clutch in the engaged position;

Fig. 3 is a view from the rear, showing part of the clutch housing broken away;

Fig. 4 is a cross-section taken on the line 4—4 of Fig. 2;

Figs. 5 and 6 are enlargements of a clutch applicator shown in the lower forward section of Figs. 1 and 2, respectively;

Fig. 7 is a perspective view of the said applicator as seen substantially from the front;

Figs. 8 and 9 are, respectively, sections taken substantially on the lines 8—8 and 9—9 of Figs. 5 and 6; and Fig. 10 is a perspective view of the follower which cooperates with the applicator of Fig. 7.

Referring specifically to the drawings, a typical engine flywheel is indicated at 15, the same having a central opening 16 leading into a rearward receptacle 17; and the flywheel also has a rearwardly extended rim 18.

The driven shaft of the clutch is indicated at 19, the same being centered in a ball bearing 20 contained in the rear portion 21 of a bell-shaped housing 22; and the latter has an entrance opening 23 in its top portion.

The forward portion of the shaft 19 is tapered as indicated at 24, then threaded at 25, and reduced with a final portion 26 which is located in the center of the flywheel receptacle 17. A ball-thrust bearing 27 is interposed between the flywheel and the final shaft portion 26.

The driving element of the clutch is primarily a ring 28 which is attached to the flywheel rim 18 from the rear by a series of bolts 29. One or more shims 30 are interposed between the ring 28 and the rim 18 to properly space these parts when the clutch is manufactured or adjusted.

The ring 28 is extended inwardly with a forwardly-facing annular channel 31 in whose bottom is deposited a lining 32 of synthetic rubber. The channel then slidably receives a facing 33 of hard composition, this facing preferably being dished from the front. A similarly-faced metal ring 34 is designed to be backed from the position of Fig. 1 to that of Fig. 2 to engage the facing 33 and thus receive the drive from the flywheel.

It is apparent that since the driven member 34 is of metal it will impose wear on the facing 33 and compression on the yieldable lining 32 after the clutch has been in operation for some time. In this event the reduction of shim thickness at 30 will serve as a take-up. However, when the operation has extended over a long period, the replacement of the facing 33 and lining 32 is necessary. This has been made an easy task in the present clutch by forming the channeled ring 28 and its lining and facing contents as a unit composed of two or more circularly-grouped segments in contact endwise or slightly spaced as indicated at 35. In fact, the unit can be built in one assembly and sawed apart on the dividing lines. The removal of the bolts 29 enables each segment of the unit to be detached and lifted out through the opening 23 of the housing by virtue of the exposed position of the unit and the relatively small size of its segments, so that a wear take-up or entire replacement of wearing parts does not require the dismantling of the clutch, as is the case in conventional clutches, becoming a comparatively simple or routine task.

The control of the engaging ring 34 is initiated by means of a conventional shifting lever 36 carried by a rock-shaft 37 in the clutch housing and effective on a shifter collar 38 slidable on the shaft 19. The clutch is disengaged when the lever 36 is tilted rearwardly—as in Fig. 1—and engaged when the lever is advanced to the substantially upright position indicated in Fig. 2.

The shifter collar 38 is extended forwardly with a circularly-spaced set of arms 39 formed with receptacles 40 for the headed inner portions 41 of a set of fingers 42. These are journaled with their outer ends on cross-bolts 43 carried by companion bars 44 forming each of three arms of a spider 45. The latter is made tight or keyed on the tapered portion 24 of the shaft 19, and is secured by means of a washer 46 and a nut 47 on the threaded portion 25. The spider bars 44 are projected from a circular plate 44b made fast on the conical part 24 of the shaft 19.

The above connection transmits direct forward or rearward swinging motion to the fingers 42 when the shifting lever 36 is operated; and the pivoting of the fingers is utilized to operate the ring 34 in the engaging and disengaging directions.

The position of each finger 42 is between the related pair of bars 44. These have bearings 48 for the cross-bolt 43; and one of the bearings has an enlarged flange 49 on its inner side. The contiguous side of the finger carries a similar flange 50 in spaced relation to the flange 49; and the finger is extended laterally from the flange 50 with a hub 51 which is eccentric in respect to the cross-bore 52 in the corresponding portion of the finger.

The eccentric hub 51 of each finger 42 is intended to act as a cam in respect to a follower 53 when the finger is swung. As indicated in Figs. 5 and 6, each follower is a flange projecting from a base plate 54 and having a substantially oval internal opening 55. Each base plate is a flush insert and secured directly to the forward face of the clutch-engaging ring 34 by countersunk screws 56, the position of each follower being in registration with one of the hub cams 51. Thus, each finger 42 is applied to a follower by the insertion of the hub cam therein. The finger is then alined with a pair of the spider bars 44 and the assembly interconnected by the insertion of the cross-bolt 43, the latter receiving a castellated nut 57 and cotter pin 58 at its remote end.

Fig. 5 shows that the hub cam 51 of a given spider arm is inclined in relation to the follower 53, so that the clutch ring 34 is held spacedly from the facing 33 of the driving unit. However, when the control lever 36 is swung forwardly to the position of Fig. 6, it is noted that the hub cam has turned in an upward direction with the effect of advancing the clutch ring 34 in the engaging direction. The ring is slidable on the rim of the plate 44b by means of internal recesses 34a made in the ring which receive blocks 44a set in the rim of the plate and secured by screws 44c.

The follower 53 is made with a slight internal projection 59 at the rear center, which causes the hub cam to impart extra travel to the follower without requiring the same to rotate beyond the position of Fig. 6. The lining 32 of course yields to this pressure until the control lever is moved slightly beyond its forward position to slightly raise the hub cam and cause it to pass the projection. Now the expansive force of the lining causes the projection 59 to bear under the cam and keep the control lever from receding from its advanced position. The lever thus becomes set against accidental retraction without any special locking device, and only by the action of the yieldable clutch lining 32.

A clutch is thus had in which wear may be taken up, or wearing parts replaced quickly and inexpensively, and which is controlled by equalized and direct pressure and a self-locking element. Further, its simple ball-thrust bearing is only in operation when the clutch is disengaged, since the driving and driven units rotate as one when the clutch is engaged; also, the ball-thrust bearing only receives pressure on the engaging action of the clutch. Finally, the novel clutch is a rugged and compact assembly devoid of springs, delicate parts or other complications.

While I have described the invention along specific lines, various minor changes and refinements may be made without departing from its principle, and I desire to consider all such changes and refinements as coming within the scope and spirit of the appended claims.

I claim:

1. A clutch comprising a power flywheel, a driving unit attached to one end of the flywheel and spaced therefrom, a driven unit in the space between the flywheel and the driving unit, clutch components carried by the units, and means to move the driven unit into and out of clutching engagement with the driving unit, the driving unit including a receptacle opening opposite the driven unit, the clutch component of the driven unit being of a permanent character, and that of the driving unit comprising a resilient lining seated in the back of the receptacle and a hard facing slid into the receptacle to seat against the lining.

2. A clutch comprising a power flywheel, a driving unit attached to one end of the flywheel and spaced therefrom, a driven unit in the space between the flywheel and the driving unit, clutch components carried by the units, and means to move the driven unit into and out of clutching engagement with the driving unit, the driving unit including an annular receptacle opening opposite the driven unit, the clutch component of the driven unit being of a permanent character and in the form of a ring adapted to enter the receptacle when the driven unit is advanced, and the clutch component of the driving unit comprising a resilient lining ring seated in the back of the receptacle and a hard facing ring slid into the receptacle to seat against the lining ring.

3. A clutch comprising a power flywheel, a housing in spaced relation to one end thereof and having an entrance opening, a driving unit attached spacedly to said flywheel end, such driving unit being in separately-attached sections which are of a size to be removable and replaceable by way of said opening, a driven unit in the space between the flywheel and the driving unit, clutch components carried by the units, the component for the driving unit being contained therein and apportioned in said sections, and means to move the driven unit into and out of clutching engagement with the driving unit.

4. A clutch comprising a housing, a power source at the front end thereof and extended rearwardly with a driving clutch component, and a driven clutch component moveable rearwardly to engage said driving clutch component, and means to actuate the driven clutch component comprising a series of rockable members in front of the driven clutch component, eccentric cams carried by the members, and followers carried by the driven clutch component with openings to receive the eccentric cams and cause the driven clutch component to move in the engaging or disengaging direction according to the direction in which said members are rocked, the rear wall of each of said openings having a projection in the path of the related eccentric cam to impart added rearward travel to the follower as the cam rotates in a given direction to engage and overcome the projection, and a yieldable element in one of the clutch components, such element expanding when said projection is overcome to lock the cam against accidental return movement from the remote side of the projection.

5. A clutch comprising a housing, a power source at the front end thereof and extended rearwardly with a driving clutch component, a center shaft, a rotary plate fast on the same, a driven clutch component slidable along tthe plate toward and from the driving clutch component, and means to actuate the driven clutch component comprising pairs of bars projecting from the plate in spider formation, a cross-bolt carried by each pair of bars, a series of fingers rockable on the cross-bolts, and cam-operated connections between the fingers and the driven clutch component to slide the latter according to the direction in which the fingers are rocked.

6. The structure of claim 5, a clutch collar slidable on the shaft, a lever to advance and retract the clutch collar, said fingers having substantially radial positions and with their outer ends rockable as stated, and receptacles carried by the clutch collar and receiving the inner ends of the fingers to transmit the motion of the lever to the same.

ROBERT L. BROWNLEE.